US009514326B1

(12) United States Patent
Kroeger et al.

(10) Patent No.: US 9,514,326 B1
(45) Date of Patent: Dec. 6, 2016

(54) SERIAL INTERPOLATION FOR SECURE MEMBERSHIP TESTING AND MATCHING IN A SECRET-SPLIT ARCHIVE

(71) Applicant: Sandia Corporation, Albuquerque, NM (US)

(72) Inventors: Thomas M. Kroeger, San Ramon, CA (US); Thomas R. Benson, Hastings, MN (US)

(73) Assignee: Sandia Corporation, Albuquerque, NM (US)

( * ) Notice: Subject to any disclaimer, the term of this patent is extended or adjusted under 35 U.S.C. 154(b) by 151 days.

(21) Appl. No.: 14/513,769

(22) Filed: Oct. 14, 2014

Related U.S. Application Data (60) Provisional application No. 61/891,318, filed on Oct. 15, 2013.

(51) Int. Cl.
*H04L 29/06* (2006.01)
*G06F 21/62* (2013.01)
*G06F 17/30* (2006.01)

(52) U.S. Cl.
CPC ..... *G06F 21/6218* (2013.01); *G06F 17/30073* (2013.01); *G06F 17/30106* (2013.01)

(58) Field of Classification Search
CPC ............ G06F 21/6218; G06F 17/30073; G06F 17/30106
USPC .......................................... 726/27, 26, 30, 2
See application file for complete search history.

(56) References Cited

U.S. PATENT DOCUMENTS

| 8,155,322 | B2 | 4/2012 | Bellare et al. | |
|---|---|---|---|---|
| 8,302,204 | B2 | 10/2012 | Grummt | |
| 8,718,283 | B2 | 5/2014 | Whyte | |
| 2004/0003254 | A1* | 1/2004 | Numao | H04L 63/0428 713/177 |
| 2005/0240591 | A1* | 10/2005 | Marceau | G06F 17/30067 |
| 2007/0027866 | A1* | 2/2007 | Schmidt-Karaca | G06F 17/301 |
| 2007/0094272 | A1* | 4/2007 | Yeh | G06F 21/10 |
| 2008/0232580 | A1* | 9/2008 | Hosaka | H04L 9/085 380/28 |

(Continued)

OTHER PUBLICATIONS

Kroeger, et al, "The Case for Distributed Data Archival Using Secret Splitting with Percival", Resilient Control Systems (ISRCS), 2013 6th International Symposium, Aug. 2013, pp. 204-209, 2013.

(Continued)

*Primary Examiner* — Sarah Su
(74) *Attorney, Agent, or Firm* — Medley, Behrens & Lewis, LLC (57) ABSTRACT

The various technologies presented herein relate to analyzing a plurality of shares stored at a plurality of repositories to determine whether a secret from which the shares were formed matches a term in a query. A threshold number of shares are formed with a generating polynomial operating on the secret. A process of serially interpolating the threshold number of shares can be conducted whereby a contribution of a first share is determined, a contribution of a second share is determined while seeded with the contribution of the first share, etc. A value of a final share in the threshold number of shares can be determined and compared with the search term. In the event of the value of the final share and the search term matching, the search term matches the secret in the file from which the shares are formed.

20 Claims, 5 Drawing Sheets (56) References Cited

U.S. PATENT DOCUMENTS

| | | | | |
|---|---|---|---|---|
| 2009/0144543 A1* | 6/2009 | Fujii | ................... | H04L 9/085 |
| | | | | 713/160 |
| 2009/0187723 A1* | 7/2009 | Jonker | ............... | G06F 21/6218 |
| | | | | 711/163 |
| 2009/0252330 A1* | 10/2009 | Patnala | ............... | H04L 9/0822 |
| | | | | 380/279 |
| 2010/0046739 A1* | 2/2010 | Schneider | ............... | H04L 9/085 |
| | | | | 380/28 |
| 2010/0049966 A1* | 2/2010 | Kato | ................ | G06F 21/556 |
| | | | | 713/153 |
| 2011/0280404 A1* | 11/2011 | Jennas, II | ............... | H04L 9/085 |
| | | | | 380/278 |
| 2012/0254619 A1* | 10/2012 | Dhuse | ................ | H04L 9/085 |
| | | | | 713/176 |
| 2014/0019774 A1* | 1/2014 | Nakayama | ............. | G06F 21/79 |
| | | | | 713/189 |

OTHER PUBLICATIONS

Shamir, A., "How to Share a Secret", Communications of the Association for Computing Machinery, vol. 22, No. 11, Nov. 1979, pp. 612-613, 1979.

\* cited by examiner

SERIAL INTERPOLATION FOR SECURE MEMBERSHIP TESTING AND MATCHING IN A SECRET-SPLIT ARCHIVE

RELATED APPLICATION

This application claims priority to U.S. Provisional Patent Application No. 61/891,318, filed on Oct. 15, 2013, entitled "SERIAL INTERPOLATION TO ENABLE SECURE MATCHING IN A SECRET SPLIT ARCHIVE", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Solutions for data archival (e.g., long-term data archival) based on secret sharing offer a way to store data that is resilient to insider threats and able to operate securely, even while parts of an archival system are compromised. In such an architecture, a file d can be split into a plurality of shares, $d_1$-$d_n$, that are distributed across a plurality of repositories to create a secure data archive. Each repository can be configured to store a single share (e.g., any of $d_1$-$d_n$) created from the single file d. Accordingly, the data (e.g., contents of the file d in its initial form) is most secure when it remains split up into each of the shares that are spread out across the repositories.

The data once more becomes vulnerable when an entity requires reassembly of the data from the respective shares, whereby the shares are reassembled at a single location. For example, an entity having access to a single device at which the shares are reassembled can then access the data in its totality, e.g., to perform a search. However, an entity with malicious intent can access the data in such a configuration, as well as a disgruntled employee who may later wish to distribute the data to expose the type of data stored, and accordingly raise awareness (e.g., public awareness) of what sort of data is being collected.

A specific set of data may require long-term archival in a very secure manner, whereby storage of the data is to be in accordance with a particular legislation, e.g., for example the data is medical information pertaining to one or more individuals and the data is to be stored, long-term, in accordance with a government legislation. While an encryption technology may be deemed "secure" at the time of archival of the data, there is a possibility of the encryption technology being subsequently breached, and accordingly, the data can then be accessed. Such breach of encryption technology can result from a long term attack on the single device, whereby the attack can utilize unlimited computing power and/or storage.

Accordingly, in comparison with conventional technologies of storing data on a single archive device, and "securing" the data by utilizing encryption, applying authorization and/or authentication technologies, etc., storage of data as shares across a plurality of repositories requires the development of technologies and systems to minimize data vulnerability, e.g., when a user is to query the data to analyze one or more items in the data.

SUMMARY

The following is a brief summary of subject matter that is described in greater detail herein. This summary is not intended to be limiting as to the scope of the claims.

Various exemplary embodiments presented herein relate to determining whether a term in a query is included in a file, whereby the term can be considered directed towards a secret included in the file. The file can be split into a plurality of sibling shares $d_1$-$d_n$, whereby the shares can be distributed between a plurality of repositories. In an embodiment, no repository stores more than one sibling share.

In order to split the file, the file's data can be treated as a sequence of binary words (e.g., 16-bit, 32-bit, 64-bit, etc.) having a particular value S. Each word in the file can be split in accordance with a generating polynomial p(x), where the polynomial p(x) can be generated such that the value, S, of the secret is located at p(0). Other points (having respective x and y coordinates) on the polynomial p(x) can be determined (e.g., based on values of x) such that each determined x and y coordinate pair can be assigned to each of the shares $d_1$-$d_n$ (and each repository) in the polynomial p(x).

A query Q can be generated, whereby the query is directed towards determining which file(s) in the archive (which have been shared across the plurality of repositories) begin with a given term in the query Q, e.g., is the term equal to S? In another embodiment, the secret S can be located anywhere in the file. Hence, the secret S can be a first term (e.g., first word) in the file, a last term, or a term located somewhere in the content of the file (e.g., $128^{th}$ word in a third chapter).

Based upon how the splitting of the file was configured, a threshold number T of repositories (and respective shares) can be queried from the total number N of repositories being utilized (and storing sibling shares), whereby T≤N.

During execution of the query, a Lagrange interpolating polynomial can be generated in a serial manner for each of the repositories in the T repositories. Owing to the interpolation process being serial, a first polynomial can be generated for the first repository, a second polynomial can be generated for the second repository, wherein the second polynomial is based at least in part on a value of the first polynomial, etc. The serial interpolation continues until the final repository is encountered, whereby a final interpolating polynomial can be generated based at least in part on the previously generated polynomial (e.g., the second polynomial) and values ascribed to the final repository.

The value at p(0) of the final interpolating polynomial can be compared with the search term in the query. In the event of a determination p(0)=the search term, a notification can be generated indicating that the term in the query equates to the secret, S, in the file. In the event of a determination that p(0)≠the search term, a notification can be generated indicating that the term in the query was not found in the file.

In an embodiment, a client component can be utilized to generate the query, and further, to control construction of the final interpolating polynomial based upon the interpolation operations being conducted across the plurality of repositories. In another embodiment, a custodian can be located at each of the repositories to facilitate interaction with the client component (e.g., transmission of messages and instructions therebetween), determination of a contribution of a share stored at a repository coupled to the custodian, and further, to enable interaction between a repository and at least one other repository.

In an embodiment, the client component can additively perturb an interim value(s) generated during the interpolating operation(s) with a nonce, whereby the nonce is known only to the client component. Utilizing the nonce can ensure that any custodians involved in the query have no knowledge of the search term in the query and/or the result.

As previously mentioned, the querying of the repositories (and the respective custodians) by the client component is performed such that each contribution of a share can be determined at the repository (e.g., by the repository custodian) on which the share is stored, and accordingly, no reassembly of the shares is required at a single location. Hence, secure storage of data is enabled based upon the file being split into shares, but the shares do not have to undergo reassembly.

The various embodiments presented herein can also be utilized to securely determine set membership without revealing a list of items in the set or an item being sought in the set. For example, to enable maintaining a list of names securely. Each name (e.g., NA . . . NZ) can be split into n shares (e.g. $NA_1 \ldots NA_n$) which are distributed across N repositories (e.g., by polynomial splitting). A query Q can be generated to determine if a specific name is in this list. Such an approach can ensure that the N repositories holding the shares do not have any knowledge of the names contained in the list but a query can be executed to enable a membership to be determined The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to querying data that is partitioned across a plurality of repositories are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Throughout the following description the following terms and definitions will be utilized with regard to the various embodiments presented herein:

Share: The output from running secret sharing on a block of data in a file d to be stored in the archive. For example, a 3:5 sharing scheme would accept a file d and generate a data set comprising five shares $d_1$-$d_5$. d can be reconstructed based upon reassembly of any three shares in $d_1$-$d_5$. In another example, a sharing scheme of 6:10 would receive a file d and generate a data set comprising ten shares $d_1$-$d_{10}$ from d. In this example, d can be reconstructed based upon reassembly of any six shares in $d_1$-$d_{10}$. It is to be appreciated that any ratio of minimum shares for reconstruction versus a total number of shares can be utilized, e.g., T:N, whereby T equals the minimum number of shares required to enable file d to be reconstructed (further described below), and N is the total number of shares formed from d (which can be considered to be the number of repositories in an archival system, as further described below). T and N are positive integers greater than 1, and T≤N.

Threshold (T): A number of shares required to recover an original secret S, whereby the secret is included in the file d, and shared amongst the various data shares. In the 3:5 example above, any 3 shares found across 5 repositories are able to reconstruct file d, or a secret S contained therein.

Sibling Share: A share is a sibling of another share if they are both generated from the same file d (e.g., a same block of data). Typically, to minimize a risk of reassembly of a file d, only one sibling share is stored on each repository.

Repository: A computer system or component (e.g., a server, memory system, etc.) configured to store and/or house one or more shares. Typically, to minimize a risk of reconstruction of an initial file d, only one sibling share is stored on each repository. As further described herein, each repository in an archival system can be located remotely from any other repository, e.g., the repositories are different data centers remotely located across a geographic region (e.g., the USA). In another embodiment, the respective repositories can be different computing devices which are co-located in a building (e.g., a hospital). In a further embodiment, the respective repositories can be separate logical partitions on a computing device. In another embodiment, the respective repositories can be cloud storage components, local and/or remote storage components, or a combination thereof.

Custodian: A component configured to manage a repository. Per the various embodiments presented herein, a custodian typically manages no more than a single repository. Each respective custodian can be configured to control authentication of an entity (e.g., a database administrator, a client component) and accordingly control access to the one or more shares stored at the respective repository.

Archive: A collection of all N repositories that together create an archival system for archiving, and operating on, data (e.g., sensitive data) in a file(s).

Client: A computing device connected to the archival system, whereby the client is connected via a separate connection to each of the repositories, and/or repository custodian(s).

As previously mentioned, sharing a file across a plurality of repositories can improve secure storage of data, but the file becomes vulnerable when the file is reassembled at a single location, with the reassembled file being generated based upon acquisition of the respective shares on a single computing device. The various embodiments presented herein are directed towards querying a plurality of shares at their respective locations (e.g., serially through a plurality of repositories), without having to acquire two or more of the shares, e.g., at a single location.

It is to be noted that in the various equations presented herein, terms highlighted by bolded text indicate the terms are vectors.

Figure 1:
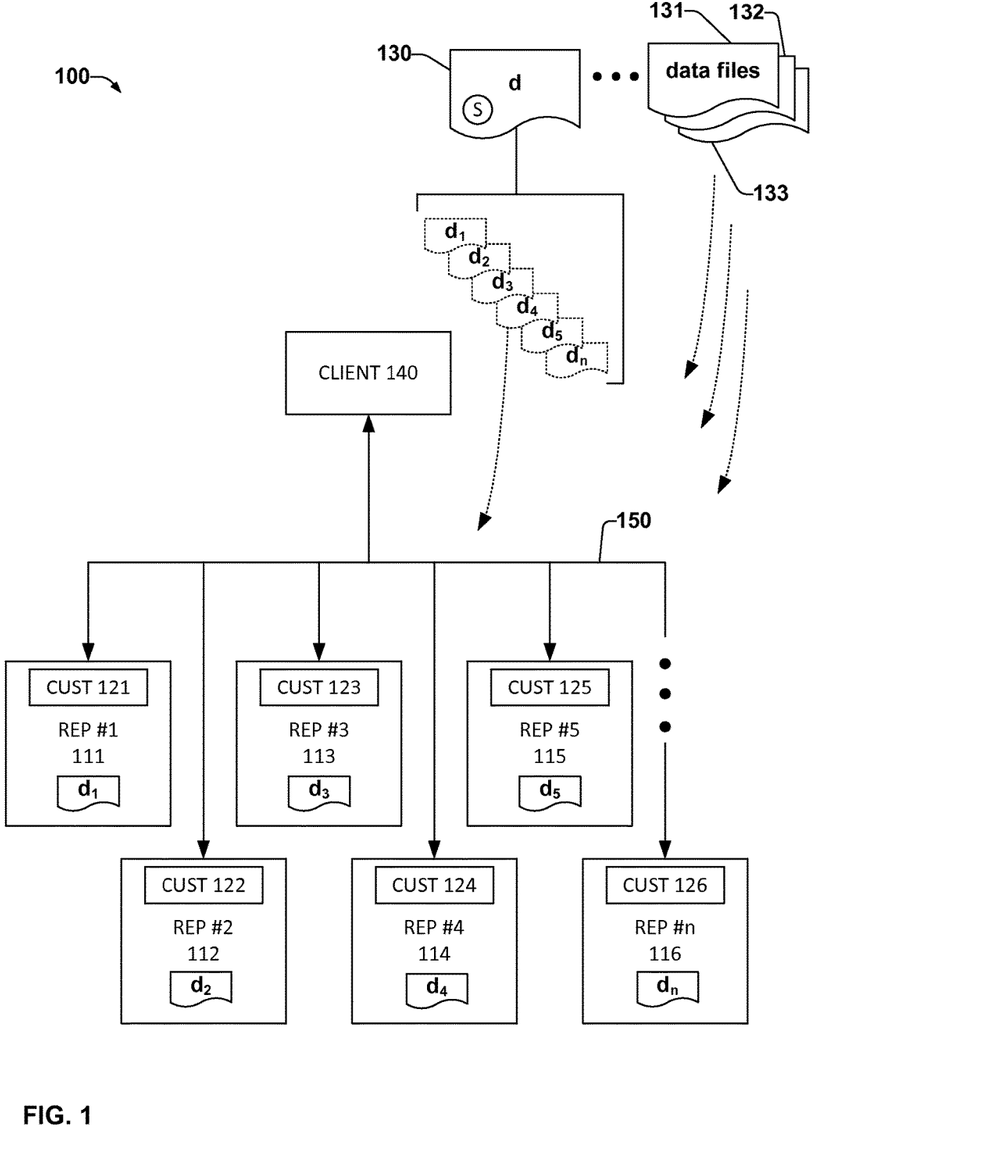
FIG. 1 is a block diagram illustrating exemplary embodiments for a data archival system.

FIG. 1 illustrates an archival system 100. In an embodiment, the archival system 100 can be utilized to query a plurality of repositories to determine whether shares $d_1$-$d_n$ stored across the plurality of repositories contribute to a secret S contained in a file d from which the shares $d_1$-$d_n$ were generated.

The archival system 100 can include a plurality of repositories, e.g., repository #1 (repository 111), repository #2 (repository 112), repository #3 (repository 113), repository #4 (repository 114), repository #5 (repository 115) . . . repository #n (repository 116). For the sake of understanding, only six repositories are shown in FIG. 1, e.g., repositories #1-#n (where n is a positive integer greater than one); however, any number of repositories can be utilized, in accordance with the various embodiments presented herein. As mentioned above, in an exemplary embodiment, the repositories 112-116 can be server computing devices that are coupled to a network (e.g., the Internet, an intranet, etc.).

Further, as shown in FIG. 1, each of the repositories 112-116 can include a custodian component. For example, repository #1 includes custodian component 121, repository #2 includes custodian component 122, repository #3 includes custodian component 123, repository #4 includes custodian component 124, repository #5 includes custodian component 125, and repository #n includes custodian component 126. As previously mentioned, each custodian component can be configured to manage a respective repository. It is to be noted that in the following description, the terms repository and custodian are used interchangeably, whereby when a repository x is presented as performing such operations as sending, calculating, receiving, identifying, matching, etc., those actions can also be considered to be being performed by the respective custodian x located at the particular repository x, and vice-versa.

In an embodiment, a file 130, d, can be split into a plurality of shares $d_1$-$d_n$, whereby each share can be stored on a respective custodian, as shown in FIG. 1. For example, repository #1 includes $d_1$, repository #2 includes $d_2$, repository #3 includes $d_3$, repository #4 includes $d_4$, repository #5 includes $d_5$, and repository #n includes $d_n$. The file 130 can comprise a secret(s) S or sensitive data, e.g., whereby archiving of the file 130 at the archival system 100 can be in accordance with a legislation or security schema. The archival system 100 can further include additional files 131-133 which can also be split into a respective plurality of shares (not shown), which can also be stored at the repositories #1-#n. It is to be appreciated that different files (e.g., any of files 130-133) can be split into different numbers of shares. In an embodiment, the file 130 can be split into a plurality of shares $d_1$-$d_n$ in accordance with a cryptographic algorithm, e.g., polynomial encoding such as Shamir Secret Sharing.

Further, a client component 140 can be included in the archival system 100, whereby the client component 140 can be utilized to access and/or interact with one or more of the custodians 121-126 and/or repositories #1-#n. A network 150 can be included in the archive system 100 to enable communication between any of the client component 140, the custodians 121-126 and/or repositories #1-#n. While not shown, as well as the network 150 connecting the client component 140 to the respective repositories and custodians, the network 150 can also be connected from one repository to another to enable communication between the respective repositories and the custodians.

It is to be appreciated that the various embodiments presented herein relate to querying of a plurality of repositories between which a file (e.g., file 130) has been split and shared. Accordingly, during the splitting operation, the T:N ratio has been utilized; hence, if a query is to be conducted upon the shares $d_1$-$d_n$ by the client component 140, the values T and N are known to the client component 140 a priori in accordance with the T:N ratio schema utilized to split the file d, and, hence, the client component 140 is presumed to have access to at least T repositories that include a share (e.g., any of $d_1$-$d_n$) of the file d. For example, each of the N repositories may require a password to access data therein, and the user of the client component 140 can have knowledge of passwords needed to access at least T of the N repositories.

In an embodiment, file d can be split into the plurality of shares $d_1$-$d_n$, whereby the splitting can be performed in conjunction with a share generating polynomial, p(x). In a further embodiment, the generating polynomial, p(x), can be of the order T−1, where, as previously mentioned, T is a threshold, of which the various embodiments presented herein can be based. As described further, in an embodiment, vector notation can be utilized to indicate operation on one or more terms at once.

During the splitting of d into shares $d_1$-$d_n$, a respective identifier for each share $d_1$-$d_n$ can be assigned to each of the shares $d_1$-$d_n$ to enable determination of which shares were generated from d, and accordingly, which shares stored across a plurality of repositories are sibling shares.

Further, for each secret S, (e.g., a word, term, string, substring, etc.) in each of the files 130-133, a value for the secret S can be generated. For example, the secret can be a word that can be converted to a bit string (e.g., a 16-, a 32-, or a 64-bit string), and the generating polynomial p(x) can be configured such that the secret S is located at p(0) of the generating polynomial p(x). Accordingly, each share (e.g., each of $d_1$-$d_n$) formed from the secret S can include a value of a point (e.g., relative to x) on a curve formed by the generating polynomial p(x), as further described herein. Hence, for each share, an x- and y-pair of coordinates can be ascribed, whereby each (x,y) pair can be considered to be a contribution of the respective (x,y) pair to the generating polynomial p(x) having the secret S located at p(0).

In a scenario whereby a plurality of files 130-131 are to be split and shared, the generating polynomial p(x) can be generated for each word in the plurality of files 130-131, whereby the client component 140 can cycle through each file d, generating a unique generating polynomial p(x) and points on the polynomial for each word in each of the files 130-133. The (x,y) points on each respective generating polynomial can then be appended to respective separate shares $d_1$-$d_n$, creating N shares to encode data included in each original file 130-133.

Accordingly, as further described below, a process of interpolation can be performed to facilitate determining whether shares (e.g., shares $d_1$-$d_n$ for file 130) stored at a plurality of repositories (e.g., repositories 111-116) are sibling shares, and hence, as part of the determination process, the sibling shares can be queried without having to reassemble the sibling shares at a single location. The interpolation process can be performed serially across the repositories, such that when a first interpolating polynomial is determined, the value(s) of the first interpolating polynomial can be forwarded for incorporation into a derivation of a subsequent interpolating polynomial. Based upon the interpolation process, a determination can be made as to whether a final interpolating polynomial p(x) formed by the contribution of the respective shares (and their respective interpolating polynomials) has a value at p(0) that equals a term in a query Q, and accordingly a secret, S. As further described below, in an embodiment, a nonce value, v, can be added, such that when a determination is being made as to whether a final interpolating polynomial p(x) has a value at p(0) that equals a term in a query Q, and accordingly a secret, S, the value of the nonce is accounted for, e.g., p(0)+nonce=term in the query Q.

A share generating polynomial p(x) can have the form:

$$p(x) = d + a_1 x + \ldots + a_{T-1} x^{T-1}, \quad (1)$$

where $a_i$ is a randomly-generated coefficient vector for i=1, . . . , T−1. A particular share (e.g., any of shares $d_1$-$d_n$) in a particular repository k (e.g., any of repositories 111-116) can be represented as:

$$d_k = p(x_k) = d + \sum_{i=1}^{T-1} a_i (x_k)^i, \quad (2)$$

where k is a positive integer having a value of 1 to n. As mentioned, a nonce, v, can be utilized to add randomness to a query Q. In an embodiment, v can be scalar and thus addition with v can be interpreted as:

$$a + v \equiv a + 1 \cdot v, \quad (3)$$

where a is a given vector and 1 is the vector of the same length with each entry equal to 1.

A number of parameters and/or concepts are further presented herein, including:

a set of n terms that will be used in a query can be denoted as $\{\sigma\} = \{\sigma_1, \ldots, \sigma_n\}$. The n terms can be seeded with the nonce v such that a repository is unable to determine the terms being sought in the query Q, or portion thereof.

Further, to enable obscuration of whether a particular match has been found, a set $\{\sigma\}$ can contain fake search terms. By utilizing one or more fake search terms, after the result of a matching has been determined, only the client component 140 will know if the significant term(s) (e.g., S) of the query Q was found.

A query Q can comprise:

a plurality of messages, $m_i$, that can be passed between the client component 140 and the repositories #1-#n. The $m_i$ messages can include several pieces of information:

a query number, q, which can be utilized to index the query, Q, upon which the respective messages are based. For example, $q_1$ identifies a first query from a second query, $q_2$, and from a subsequent query, e.g., $q_3$;

an $i^{th}$ interpolant, whereby the interpolant can be denoted as:

$\gamma_i$, if the subject interpolant is to be passed to another repository, or $\tilde{\gamma}_i$, if the subject interpolant is to be returned to the client component 140.

The messages can also include the set of x-coordinates of the T repositories that will be used in a query, $\{x\} = \{x_1, \ldots, x_T\}$.

Further, three types of messages can be utilized herein:

message $m_0$: utilized during initiation of a query Q and can specify the repositories to be used in a reconstruction of file d. For example, with a 3:5 operation, message $m_0$ can indicate which three repositories are to be utilized from the available repositories #1-#n;

message $\tilde{m}_T$: includes a search term(s) $\{\sigma\}$ that is sent from the client component 140 directly to the final repository used in a search of the share located at the final repository (e.g., $d_T$); and message $m_*$: includes the results of a search performed at a particular repository that is sent from that particular repository back to the client component 140.

In an embodiment, subsequent to the distribution of the shares $d_1$-$d_n$ across a plurality of repositories #1-#n in the archival system 100, the plurality of repositories #1-#n can be queried to determine whether a plurality of shares $d_1$-$d_n$ stored at the repositories #1-#n are generated from a file d that contains a particular word, term, string, etc. For example, a query can be executed at the client component 140 as to whether a name, e.g., "John", is the first word in the file d from which the shares $d_1$-$d_n$ were generated, such that "John" is the secret S in the file d. Accordingly, do any of the respective shares stored at the repositories contribute to enable a determination that a file 130 (e.g., or any of files 131-133) has the word "John" as the initial word in the file? It is to be appreciated that while the exemplary embodiment is directed to identifying a first word in a file, the query can be performed on any string or substring located at any position in the files 130-133, for example, a number string that is the $127^{th}$ term in a file. As previously mentioned, the query can be performed without having to reassemble of any of the files 130-133 from their respective shares.

In a further embodiment, as previously mentioned, the client component 140 can utilize a nonce v, such that when a repository is queried (e.g., the last or final repository search during the query), a custodian located at the final repository can be prevented from knowing the term that is being sought in a query, and also any secret(s) in the file d.

To facilitate understanding, in the following example, matching can be performed on a first word in each file 130-133, based upon a contribution of shares generated from each of the files 130-133, (e.g., a required number of shares in shares $d_1$-$d_n$ for file d). It is to be appreciated that the algorithm can be expanded to a broader search across the shares and also for longer strings. Continuing the previous exemplary ratio of 3:5, the file 130 has been split into five shares (e.g., $d_1$-$d_5$), whereby a share is stored in one of the respective five repositories (e.g., rep #1-rep #5). Accordingly, in this example, T=3.

The archival system 100 (e.g., the client component 140, or another storage controlling component) can store a secret of a file as a y-intercept of a generating polynomial, such that a particular secret S in the file d=p(0). To facilitate one or more operations on the secret stored in file d, that is now spread across the data shares $d_1$-$d_n$, without actually reassembling the data d, the client component 140 can utilize Lagrange interpolating polynomials, whereby the Lagrange interpolating polynomials can be built serially across the T repositories 111-116. In mathematical terms, an algorithm can be utilized that computes a y-intercept of an interpolating polynomial by summing contributions from a number of Lagrange polynomials in a serial fashion. As mentioned, the client component 140 can additively perturb the interpolating polynomial(s) with a nonce.

Hence, given a set of T points, $\{(x_1, p(x_1)), \ldots, (x_T, p(x_T))\}$, the generating polynomial, $p(x)$, of order T−1, can be reconstructed as:

$$p(x) = \sum_{i=1}^{T} L_i(x) \cdot p(x_i), \quad (4)$$

where, per Eqn. 5 below, an interpolation polynomial $L_i$ can be determined as follows:

$$L_i(x) = \prod_{\substack{1 \le j \le T \\ j \ne i}} \frac{(x - x_j)}{(x_i - x_j)} = \frac{(x - x_1)}{(x_i - x_1)} \cdots \frac{(x - x_{i-1})}{(x_i - x_{i-1})} \cdot \frac{(x - x_{i+1})}{(x_i - x_{i+1})} \cdots \frac{(x - x_T)}{(x_i - x_T)}. \quad (5)$$

In the case of interpolation across a plurality of repositories 111-116, it is assumed that the list of repositories to be used to find a match (e.g., a list of the $x_i$) with a term in a query Q is known to all of the repositories that are to be involved in the query operation. Furthermore, data included at each repository, $d_i = p(x_i)$, is assumed to be private and known only to the repository (e.g., respective repositories 111-116) that owns the data (e.g., respective data shares $d_1$-$d_n$). Accordingly, all of the repositories (e.g., respective repositories 111-116) can compute any of the respective interpolating polynomials $L_i(x)$, but only repository i (e.g., a single repository in the repositories 111-116) has access to, or knows, $d_i = p(x_i)$. Hence, by distributing each share of a secret having a value S across the specified repositories, it is possible to serially calculate the secret $S = p(0)$. For example, in order to serialize a reconstruction across three repositories (T=3), a distributed reassembly of a given secret S can be performed, per Eqn. 6 below. To enable the distributed reassembly of a given secret S each of the repositories 111-113 can execute a respective interpolating polynomial as indicated in Eqn. 6, whereby as previously mentioned, any functions performed at the repositories 111-113 can be based upon instructions generated by the client component 140:

$$S = p(0) = \text{contribution of rep \#1} + \quad (6)$$
$$\text{contribution of rep \#2} + \text{contribution of rep \#3}$$

$$S = p(0) = \underbrace{\frac{x_2 x_3}{(x_1 - x_2)(x_1 - x_3)} \cdot p(x_1)}_{\text{Repository \#1}} + \underbrace{\frac{x_1 x_3}{(x_2 - x_1)(x_2 - x_3)} \cdot p(x_2)}_{\text{Repository \#2}} + \underbrace{\frac{x_1 x_2}{(x_3 - x_1)(x_3 - x_2)} \cdot p(x_3)}_{\text{Repository \#3}}$$

whereby, a process of serially interpolating the threshold number of shares can be conducted; a contribution of a first share can be determined, a contribution of a second share can be determined while seeded with the contribution of the first share, etc. A contribution of a final share can be determined while seeded with the contribution of the previous share. It is to be noted that evaluation of the polynomial is being performed for x=0, thus the numerators in Eqn. 6 can simplify to a product of two negative numbers.

In a first embodiment, each of the respective Lagrange interpolating polynomial formulas can be stored at each repository 111-116, and can be accessed by the respective custodian located at each repository such that when a custodian calculates the Lagrange interpolating polynomial for the share stored at the repository (e.g., per an instruction from the client component 140), the Lagrange interpolating polynomial formula is readily available. In another embodiment, the respective Lagrange interpolating polynomial formula can be forwarded to each repository 111-116 as part of the messaging undertaken between the client component 140 and the respective custodian, as further described herein.

Figure 2:
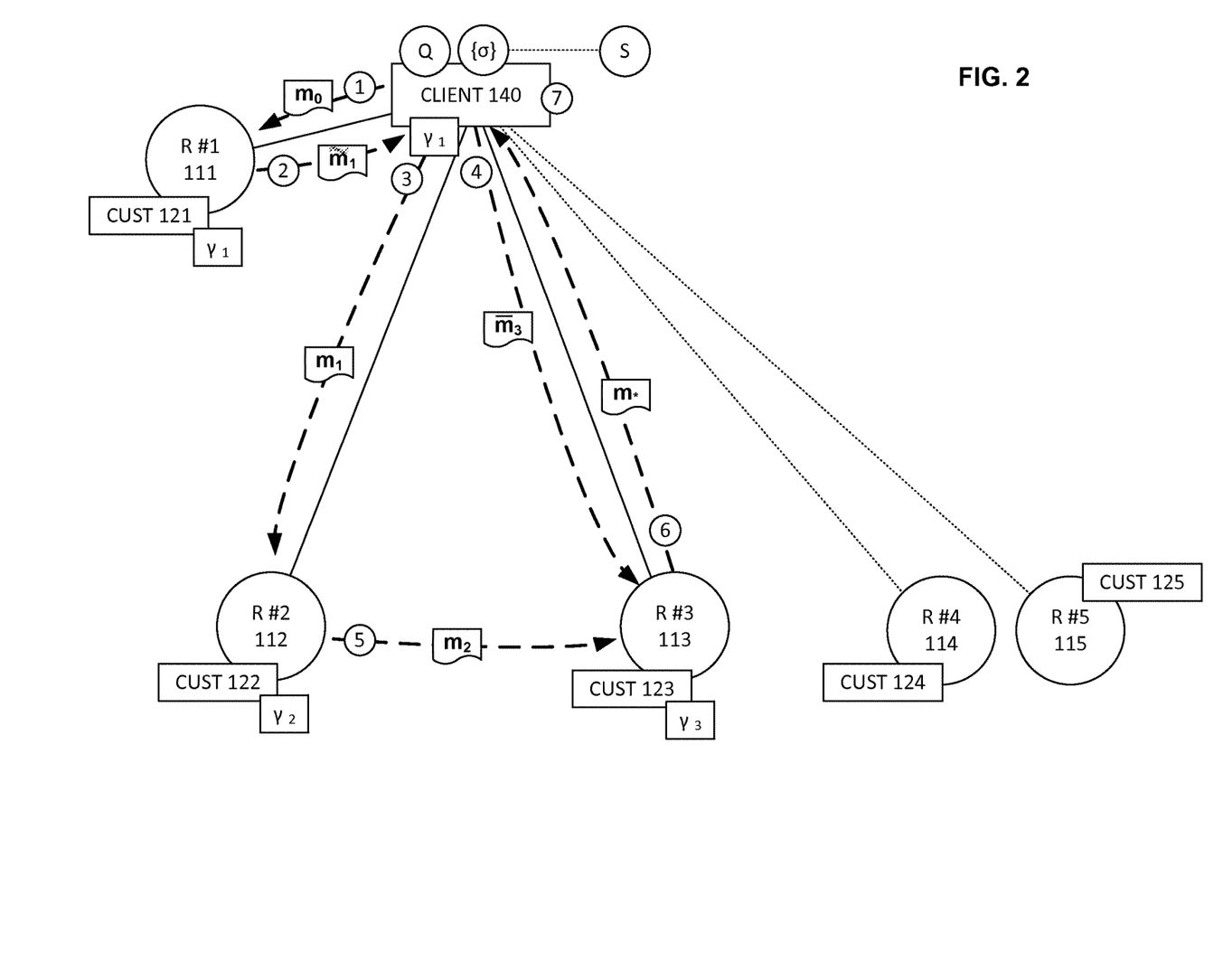
FIG. 2 is a schematic of a query being executed across a plurality of repositories.

FIG. 2 is presented to facilitate understanding of the various embodiments herein, whereby the exemplary case is presented in which the archival system 100 has a threshold of T=3, whereby a first term "John" (e.g., a 32-bit ASCII representation) is included in a query to determine if any files (e.g., files 130-133) comprise "John" as a first word. It is to be appreciated that while FIG. 2 illustrates an archival system 100 comprising five repositories (e.g., repositories 111-115), the methodology presented in FIG. 2 is only dependent on a threshold value T utilized by the archival system 100 and is independent of the number of shares distributed across the repositories 111-115. As previously described, each file (e.g., file 130) has been split into a plurality of shares (e.g., shares $d_1$-$d_n$), which have been placed across the repositories. With reference to FIG. 2, the following steps are performed:

STEP 1: A query Q can be initiated at the client component 140, whereby the query Q has an index q. The query includes a term σ (e.g., a search term). In the example presented herein, the query comprises "John", and the system 100 is configured to determine if a file (e.g., any of files 130-133) includes such term.

As previously described, file d has been split amongst N repositories in accordance with a threshold T. In this example, the client component 140 is provided with information a priori indicating T for the file d. In the example presented in FIG. 2, T=3. In the example presented in FIG. 2, repositories #1, #2 and #3 are selected, hence $x_1$, $x_2$, and $x_3$ in the subsequently described messages are related to repositories #1, #2 and #3, respectively. Based upon the foregoing, a first message, $m_0$, is generated by the client component 140 in accordance with search criteria of the query Q, e.g., does the name "John" appear as a first term in a file? The first message, $m_0$, is sent to repository #1, wherein the first message can also include an instruction generated by the client component 140 for the custodian 121 at the repository #1 to calculate the contribution of share $d_1$ to the file d. The first message $m_0$ can request that repository #1 transfer a contribution of the share $d_1$ that is stored at the repository #1 to the client component 140, whereby the contribution of the share $d_1$ is directed to the interpolation operation (e.g., as performed by custodian 121). It is to be appreciated that a plurality of shares (not shown) can be stored at repository #1, whereby each share is generated from a respective file 130-133, and their respective contribution to the first message $m_0$ can also be returned to the client component 140.

STEP 2: the custodian 121 at the repository 111 can perform a calculation operation, per:

$$\tilde{\gamma}_1 = \frac{x_2 x_3}{(x_1 - x_2)(x_1 - x_3)} \cdot p(x_1), \quad (7)$$

wherein, the calculation operation is based on the share(s) generated from the file 130 (and also files 131-133 when more than one share is stored at the repository #1) that is stored at the repository #1 and its respective contribution to a first word in file 131 (and also files 130-133 when more than one share is stored at the repository #1). Upon performing the calculation, the custodian component 121 can send a second message, $\tilde{m}_1$, to the client component 140, whereby the second message can comprise $\tilde{m}_1=[q, \tilde{\gamma}_1, \{x_1, x_2, x_3\}]$.

STEP 3: a random nonce value, v, is generated by the client component 140 to additively perturb the query Q. Further, the client component 140 can compute $\gamma_1$ to include v, hence:

$$\gamma_1 = \frac{x_2 x_3}{(x_1 - x_2)(x_1 - x_3)} \cdot p(x_1) + v. \quad (8)$$

Subsequently, the client component 140 can send a third message, $m_1$, to the repository #2, whereby the third message $m_1=[q, \gamma_1, \{x_1, x_2, x_3\}]$. The vector $\gamma_1$ now represents the first term of the interpolation for the first word in file d, additively masked with the nonce v. As previously mentioned, v is only known by the client component 140. The third message can also include an instruction generated by the client component 140 for the custodian 122 at the repository #2 to calculate the contribution of share $d_2$ to the file d, and further, when the contribution of share $d_2$ has been determined, to forward the contribution to the next repository being queried, e.g., repository #3.

STEP 4: client component 140 further forwards the terms of the query Q, additively perturbed by the same nonce, v, in a fourth message, $\overline{m}_3=[q, \{\sigma_1, \ldots, \sigma_n\}]$ to repository #3. Hence, if it is desired that a list of all files d whose first word matches "John" is obtained, a 32-bit value of "John" is generated, the nonce, v, is added, and the resultant value is utilized as the search term in the query Q. As previously mentioned, utilizing the nonce prevents the client component 140 from revealing terms in the query Q to repository #3. Additionally, if the client component 140 wishes to obfuscate the term for which a match is being sought (and ultimately found), additional terms can be added to the query by the client component 140. The fourth message can also include an instruction generated by the client component 140 for the custodian 123 at the repository #3 to calculate the contribution of share $d_3$ to the file d.

STEP 5: the custodian 122 located at repository #2 can calculate a portion of the interpolation associated with content in repository #2, such that:

$$\gamma_2 = \frac{x_1 x_3}{(x_2 - x_1)(x_2 - x_3)} \cdot p(x_2) + \gamma_1. \quad (9)$$

As previously mentioned, the values for $x_i$ (e.g., for the list of repositories) are globally known values about the repositories. The value $p(x_2)$ corresponds to the contribution of the share $d_2$ to the first word in file d. Based on such information, repository #2 can calculate $\gamma_2$. Further, the custodian 122 can transmit a fifth message $m_2=[q, \gamma_2\{x_1, x_2, x_3\}]$ to the repository #3 (e.g., in accordance with the instruction from the client component 140).

STEP 6: the custodian 123 located at repository #3 can calculate a final contribution to the interpolation, per:

$$\gamma_3 = \frac{x_1 x_2}{(x_3 - x_1)(x_3 - x_2)} \cdot p(x_3) + \gamma_2. \quad (10)$$

Further, the custodian 123 can compare entries in $\gamma_3$ to the one or more search term(s) in the fourth message $\overline{m}_3=[q, \{\sigma_1, \ldots, \sigma_n\}]$ received from the client component 140 in step 4. A sixth message $m_*=[q, \{fid_1, \ldots, fid_m\}]$, containing identities of the matching share(s), is returned to the client component 140.

STEP 7: The sixth message is received at the client component 140. In response to receiving an indication of a match from the repository #3 (e.g., the final repository), the client component 140 can generate a notification that the term "John" was found as the first term in the file d based upon the contributions of $d_1$-$d_3$ (out of $d_1$-$d_5$). The notification can be presented on a display device (not shown) communicatively coupled to the client component 140. Further, the notification can be transmitted by the client component 140 to any device communicatively coupled to the client component 140, whereby the notification can be an email, an alert, etc.

To demonstrate the above methodology, the following example is presented. A secret is a combination to a safe that has been set by a person, e.g., named Christine. For example, the combination=854 is included in the file d. Christine requires that the file d is kept secret from any two people of their five colleagues. But Christine also wants to ensure that, in an emergency, any three of the five colleagues can combine their information to open Christine's safe. To do so, Christine encodes the combination, d=854, into N=5 shares (e.g., $d_1$-$d_5$) and requires that a threshold of T=3 shares can be utilized to recover the secret, whereby each of Christine's co-workers are given a share (e.g., any of $d_1$-$d_5$). To enable Christine to do this, a random generating polynomial of degree two can be generated, since any three points (e.g., based upon T=3) can uniquely identify a second order polynomial. A random generating polynomial can be:

$p(x)=d+276x+53x^2$, such that given d=854, $$p(x)=854+276x+53x^2. \quad (12)$$

Accordingly, it is desired to verify that the safe combination is $\sigma=854$. For simplicity, it is assumed that the repositories #1-#n take their index as their "x-coordinate", e.g., $x_i=i$. Christine's safe combination "854" is encoded as the value of the generating polynomial curve at x=0. Shares $d_1$-$d_5$ can now be created by generating points along polynomial curve at positions other than 0, namely for the 5 respective shares and repositories:

(1, 1183) (2, 1618) (3, 2159) (4, 2806) (5, 3559)

By combining any three of these points (e.g., any three of the five shares), Christine's colleagues can solve an interpolating polynomial and recover the combination. However, with only two shares, there are as many polynomials as there are possible values for file d, all equally likely.

A query Q can be generated at the client component 140 such that the query Q is directed towards the three repositories #1, #3, and #5 (in accord with T=3). Further, a nonce can be generated by the client component 140, e.g., v=400. The client component 140 can further generate an index q, and a search term of $\sigma_v=854+v=854+400=1254$. The client component 140 then sends a first message $m_0=[q, \{1, 3, 5\}]$, to the repository #1.

In response to receiving the first message $m_0$ from the client component 140, custodian 121 located at repository #1 reviews a share(s) $d_1$ stored at the repository #1 computes $\tilde{\gamma}_1$ by first computing:

$$L_1(0) = \frac{(0-3)(0-5)}{(1-3)(1-5)} = \frac{15}{8} = 1.875 \quad (13)$$

and subsequently computing, per Eqn. 14 below:

$$\tilde{\gamma}_1 = L_1(0) \cdot p(1) + \gamma_0 = \frac{15}{8} \cdot 1183 = \frac{17745}{8} = 2218.125. \quad (14)$$

The custodian 121 then sends a second message $\tilde{m}_1 = [q, \tilde{\gamma}_1 = 2218.125, \{1, 3, 5\}]$ back to the client component 140.

The client component 140 adds the nonce $v = 400$ to $\tilde{\gamma}_1$ to obtain $\gamma_1 = 2618.125$ and forwards a third message $m_1 = [q, \gamma_1 = 2218.125, \{1, 3, 5\}]$ on to repository #3. The client component 140 sends a fourth message $\tilde{m}_5 = [q, \sigma = 1254]$ containing the nonced search term, to the repository #5.

The custodian 123 located at the repository #3 performs a computation:

$$L_3(0) = \frac{(0-1)(0-5)}{(3-1)(3-5)} = -\frac{5}{4} = -1.25. \quad (15)$$

The custodian 123 subsequently computes, per Eqn. 16 below:

$$\tilde{\gamma}_3 = \quad (16)$$

$$L_3(0) \cdot p(3) + \gamma_1 = \frac{5}{4} \cdot 2159 = \frac{20945}{8} = -\frac{645}{8} = -80.625.$$

Accordingly, the custodian 123 generates and sends a fifth message $m_3$ to the repository #5, whereby $m_3 = [q, \gamma_3 = -80.625, \{1, 3, 5\}]$.

The custodian 125 located at the repository #5 can complete the computation by computing:

$$L_5(0) = \frac{(0-1)(0-3)}{(5-1)(5-3)} = \frac{3}{8}; \text{ and} \quad (17)$$

$$\gamma_5 = L_5(0) \cdot p(5) + \gamma_3 = \frac{3}{8} \cdot 3559 + \left(-\frac{645}{8}\right) = 1254. \quad (18)$$

The custodian 125 at the repository #5 can then compare the resulting $\gamma_5$ with the search term in the fourth message $\tilde{m}_5$ provided by the client component 140, where $\sigma_v = 1254$, to determine if there is a match. In this example, the custodian 125 determines that, yes, $\sigma_v = \gamma_5$. Based upon the positive affirmation, the custodian 125 sends a positive notification (or result) to the client component 140 verifying the combination of contributions from shares $d_1$-$d_3$ matches "John" to the client component 140. In response to receiving the notification, the client component 140 can provide indication of the positive result, e.g., via a display device, a data transmission, etc.

The various embodiments presented herein assumes T−1 (e.g., 2 repositories in the example above) repositories can be compromised without a secret in the file d being identified. If repositories #1 and #3 in the example above are compromised, information at the repositories #1 and #3 can be colluded to enable determination of the nonce, v. However, the repositories #1 and #3 do not have the contribution of repository #5 to the interpolation or the search term sent to repository #5, hence repositories #1 and #3 (or the associated custodians 121 and 123) are unable to determine either the secret in the file d or a search term forming the query, Q. Further, based on the example above, if an adversary has access to repository #5 and one of the other two repositories (e.g., either of repository #1 or repository #3), the adversary is unable to determine the nonce as they only have one side of the insertion of the nonce.

Figure 3:
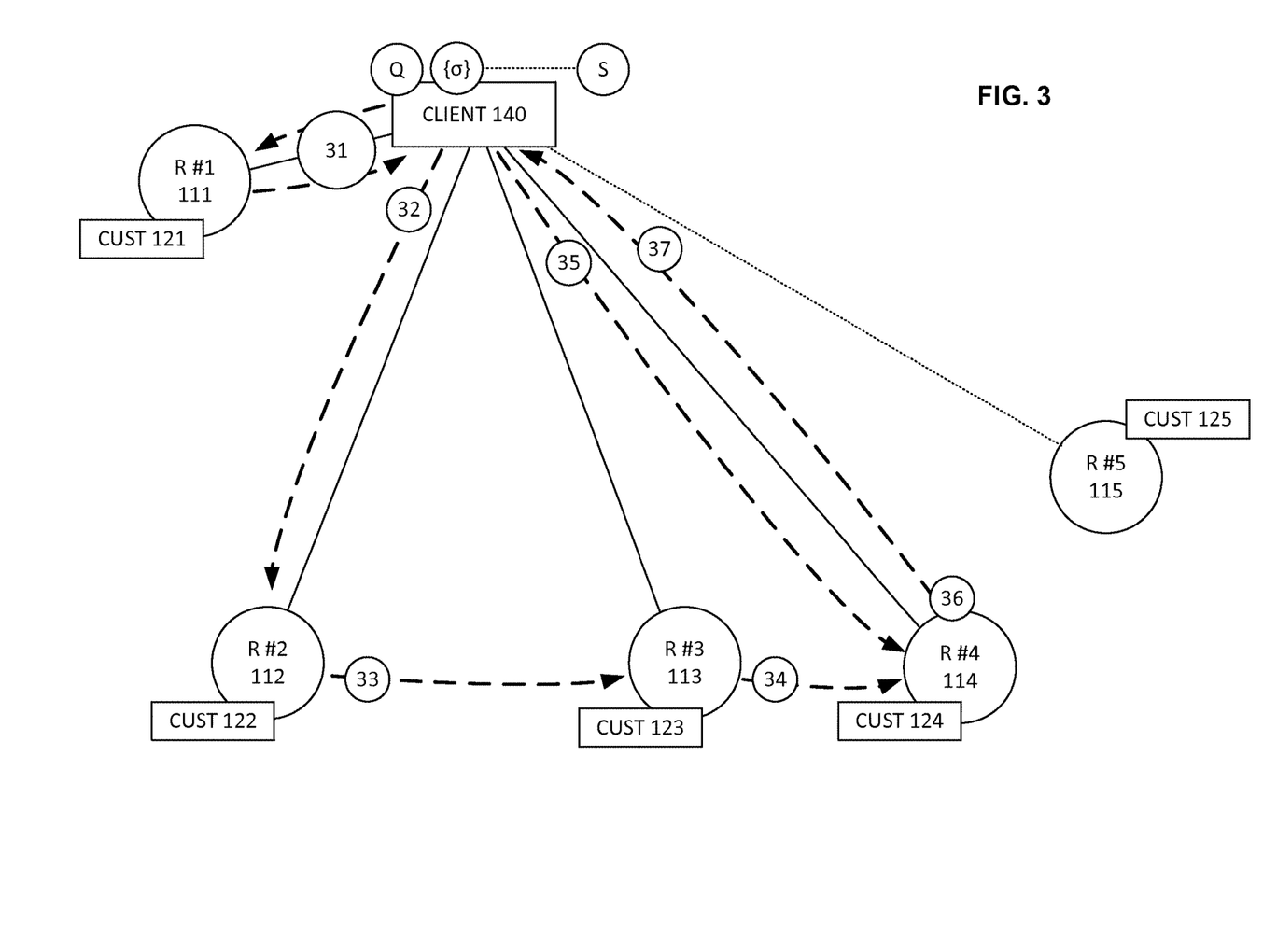
FIG. 3 is a schematic of a query being executed across a plurality of repositories.

Per the various embodiments presented herein, as the threshold of the system 100 is increased to four or more (e.g., T≥4), a situation can occur whereby two repositories have been compromised and hence can be utilized by an adversary to determine the nonce, v, and further, the two compromised repositories can be colluded with a third repository to capture the final state. (FIG. 3 illustrates an example of this attack, as further described below).

In situations in which it is required that an archival system 100 can operate with more than two compromised repositories, the requirement can be met to resist the previously described attack of T≥4 by the client component 140 continuing to inject nonces serially into the interpolation process. An algorithm (also referred to as a "generalized matching algorithm") that addresses a requirement for the archival system 100 to operate with more than two repositories compromised, e.g., support T−1 compromised repositories for any T:N archive for any values of T≥4 is now presented.

In an embodiment, the client component 140 must add a nonce after interaction with the first repository and then after interaction with every subsequent two repositories to ensure data protection with T−1 repositories is not compromised. The algorithm detailed below assumes that the T repositories that will be used in the query are the first T repositories (e.g., repositories 1 through 7). It is to be noted that any contributions denoted with a tilde (~) are those contributions for which the value of the nonce could be determined by j−1 collaborating repositories, hence these contributions are also the tilded messages sent back to the client component 140 for additional nonces.

Algorithm 1: A "general matching algorithm" for a secret-split archive.

1: procedure MATCH($\sigma_1, \ldots, \sigma_n$)
2: Client component 140 generates query ID, q.
3: Client component 140 sends message $m_0 = [q, \{x_1, \ldots, x_t\}]$ to the repository #1 (e.g., to custodian 121 at repository #1).
4: Custodian 121 at repository #1 computes:

$$\tilde{\gamma}_1 = L_1(0) \cdot p(x_1)$$

5: Custodian 121 sends $\tilde{m}_1 = [q, \gamma_1, \{x_1, \ldots, x_t\}]$ to the client component 140.
6: Client component 140 computes $$\gamma_1 = \tilde{\gamma}_1 + v_1$$

7: Client component 140 sends $m_1 = [q, \gamma_1, \{x_1, \ldots, x_t\}]$ to the custodian 122 at repository #2.
8: for j=2, ..., T−1 do
9: if j is even then
10: Repository j receives message $m_{j-1}$ and computes $$\gamma_1 = L_j(0) \cdot p(x_j) + \gamma_{j-1}$$

11: Repository j sends $m_j = [q, \gamma_j, \{x_1, \ldots, x_t\}]$ to Repository j+1.
12: else
13: Repository j receives message $m_{j-1}$ and computes $$\tilde{\gamma}_j = L_j(0) \cdot p(x_j) + \gamma_{j-1}$$

14: Repository j sends $\tilde{m}_j = [q, \tilde{\gamma}_j, \{x_1, \ldots, x_t\}]$ to the client component 140.
15: The client component 140 computes $\gamma_j = \tilde{\gamma}_j + v_j$
16: The client component 140 sends $m_j = [q, \gamma_j, \{x_1, \ldots, x_t\}]$ to Repository j+1.

17: end if
18: end for
19: The client component 140 sends $\tilde{m}_T=[q, \{\sigma_1, \ldots, \sigma_t\}]$ to Repository T.
20: Repository T receives messages $\tilde{m}_T$ and $m_{T-1}$
21: Repository T computes $$\gamma_1 = L_j(0) \cdot p(x_j) + \gamma_{j-1}$$

22: Repository T compares the $\{\sigma_1, \ldots, \sigma_n\}$ to $\gamma_T$
23: return a matching list of files $m_* = [q, \{f_1, \ldots, f_l\}]$ to the client component 140.
24: end procedure As previously mentioned above, two properly placed and colluding repositories can determine a nonce added by the client component 140. The following is a detailed discussion for such a scenario.

The generalized matching algorithm, as previously presented can be utilized to address an adversary attempting to determine a nonce by utilizing two colluding repositories. To facilitate understanding of utilization of the generalized matching algorithm, a first scenario is presented in FIG. 3, where an attack is conducted without utilizing the generalized matching algorithm. Further, a second scenario is presented in FIG. 4, whereby the approach of nonce addition is presented.

With reference to FIG. 3, if an adversary has access to two repositories on both sides of the addition of a nonce by the client component 140, it is possible for the adversary to determine the value of the nonce. If the adversary also owns (e.g., has access to) a final repository over which a query Q is to be conducted, it is possible for the adversary to uncover both the secret in the file d and the one or more search terms included in the query, Q.

FIG. 3 is a variation of the scenario presented in FIG. 2, however FIG. 3 is based upon T=4. Hence, naively extending the example in FIG. 2, e.g., without adding additional nonces as detailed in the generalized matching algorithm, the following procedure can be conducted by an adversary.

STEP 31: The client component 140 initiates a query Q, and in response to receiving Q, repository #1 returns its contribution to the client component 140, whereby:

$$\tilde{\gamma}_1 = L_1(0) \cdot p(x_1).$$

STEP 32: The client component 140 computes:

$$\gamma_1 = \tilde{\gamma}_1 + v,$$

and sends a message $m_1 = [q, \gamma_1, \{x_1, x_2, x_3, x_4\}]$ to repository #2.

STEP 33: repository #2 computes:

$$\gamma_2 = L_2(0) \cdot p(x_2) + \gamma_1,$$

and sends a message $m_2 = [q, \gamma_1, \{x_1, x_2, x_3, x_4\}]$ to repository #3

STEP 34: repository #3 computes:

$$\gamma_3 = L_3(0) \cdot p(x_3) + \gamma_2,$$

and sends a message $m_3 = [q, \gamma_3, \{x_1, x_2, x_3, x_4\}]$ to repository #4

STEP 35: The client component 140 forwards the nonced search term information, $\{\sigma\}_v$ to repository #4 for matching.

STEP 36. repository #4 computes $$\gamma_4 = L_4(0) \cdot p(x_4) + \gamma_3,$$

and matches the entries in $\gamma_4$ against the term $\{\sigma\}$.

STEP 37: Repository #4 sends the results of the matching back to the client component 140.

In the event of an adversary having compromised repositories #1, #2, and #4 of the example presented in FIG. 3, the adversary knows the data stored on repository 1, $p(x_1)$, and is able to see the incoming message $m_1$ that was sent to repository #2, where $m_1 = [q, \gamma_1, \{x_1, x_2, x_3, x_4\}]$. The values of $L_i$ are computable as it is assumed that the adversary knows the $x_i$ of all of the repositories involved in the query Q. Thus the adversary is able to determine the value of the nonce, v:

$$v = \gamma_1 - L_1(0) \cdot p(x_1).$$

With the nonce v discovered, the adversary is able to compute the secret in the file d by observing the message received at repository #4 from repository #3, $m_3 = [q, \gamma_3, \{x_1, x_2, x_3, x_4\}]$, such that:

$$d = p(0) = \gamma_3 + L_4(0) \cdot p(x_4) - v.$$

The adversary can also discover the search term(s), which has also been perturbed by the nonce:

$$\{\sigma\} = \{\sigma\}_v - v.$$

Per the foregoing, the methodology presented in FIG. 3 can only support up to 2 compromised repositories. For cases where data protection is desired with more than two repositories compromised, the generalized matching algorithm (e.g., based upon Algorithm 1) can be utilized.

Figure 4:
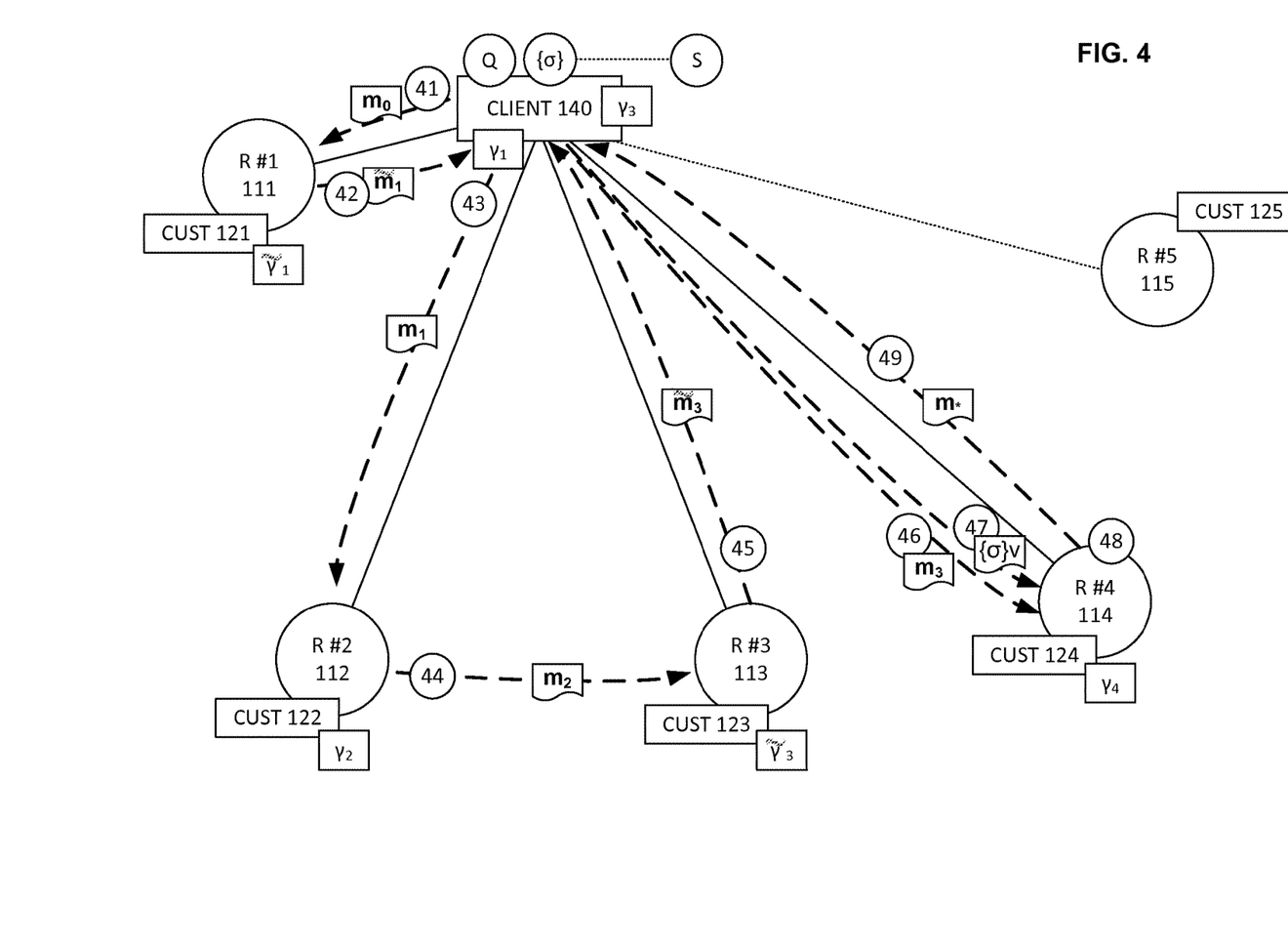
FIG. 4 is a schematic of a query being executed across a plurality of repositories.

FIG. 4 presents another exemplary scenario based on FIG. 2, whereby it is assumed that an adversary has compromised repositories #1, #2, and #4.

Step 41: The client component 140 initiates a query Q, generates an index q, and further identifies a number of repositories (e.g., $x_1, \ldots, x_t$) over which to perform the query. The client component 140 forwards a first message $m_0$ to the repository #1, whereby $m_0 = [q, \{x_1, \ldots, x_t\}]$.

STEP 42: In response to receiving the first message $m_0$, at repository #1 the custodian component 121 calculates its contribution:

$$\tilde{\gamma}_1 = L_1(0) \cdot p(x_1).$$

Upon performing the calculation, the custodian component 121 can send a second message, $\tilde{m}_1$, to the client component 140, whereby the second message can comprise of $\tilde{m}_1 = [q, \tilde{\gamma}_1, \{x_1, x_2, x_3\}]$.

STEP 43: The client component 140 computes $\gamma_1$, whereby the term $\gamma_1$ includes a first nonce, $v_1$:

$$\gamma_1 = \tilde{\gamma}_1 + v_1,$$

and sends a third message $m_1 = [q, \gamma_1, \{x_1, x_2, x_3, x_4\}]$ to repository #2.

STEP 44: in response to receiving the second message at the repository #2, the custodian component 122 computes:

$$\gamma_2 = L_2(0) \cdot p(x_2) + \gamma_1,$$

and forwards a fourth message $m_2 = [q, \gamma_2, \{x_1, x_2, x_3, x_4\}]$ to the repository #3.

STEP 45: in response to receiving the fourth message at the repository #3, the custodian component 123 computes:

$$\tilde{\gamma}_3 = L_3(0) \cdot p(x_3) + \gamma_2,$$

and sends a fifth message $\tilde{m}_3 = [q, \tilde{\gamma}_3, \{x_1, x_2, x_3, x_4\}]$ to the client component 140.

STEP 46: in response to receiving the fifth message, the client component 140 computes, $\gamma_3$, whereby the term $\gamma_3$ includes a second nonce, $v_3$:

$$\gamma_3 = \tilde{\gamma}_3 + v_3,$$

and sends a sixth message $m_3 = [q, \gamma_3, \{x_1, x_2, x_3, x_4\}]$ to the repository #4.

STEP 47: Further, the client component 140 sends the nonced search term information, $\{\sigma\}v$, as a seventh message, to repository #4 for matching.

STEP 48: In response to receiving the sixth message and the nonced search term information in the seventh message at repository #4, custodian 124 computes:

$$\gamma_4 = L_4(0) \cdot p(x_4) + \gamma_3.$$

And, further, custodian 124 matches the entries in $\gamma_4$ against $\{\sigma\}$.

STEP 49: The custodian 124 sends the results of the matching at repository #4 back to the client component 140.

The difference between the example presented in FIG. 4 and the example presented in FIG. 3 is that the second nonce, $v_3$, is not discoverable with the information provided in FIG. 4. Per FIG. 4, the adversary is still able to exploit knowledge of repositories #1 and #2 in order to discover $v_1$. However, there is not sufficient information for the adversary to discover the secret data or the query Q information in this scenario:

$$\gamma_3 = L_4(0) \cdot p(x_4) - v_1 = p(0) + v_3, \quad (19)$$

and likewise, $$\{\sigma\}_v - v_1 = \{\sigma\} + v_3. \quad (20)$$

For the example scenario presented in FIG. 4, the adversary is unable to recover the secret or the true value of the query with any certainty. Accordingly, the information-theoretic security of the file d is maintained by the addition of a second nonce, e.g., $v_3$.

In an aspect, the matching algorithm presented herein in FIGS. 1, 2, and 4, enables a final repository (e.g., Rep #3 of FIG. 2, and Rep #4 of FIG. 4) to identify which files 130-133 have the same prefix, e.g., which files have a first word="John". To address such a scenario, the client component 140 can vary the nonce used across the values in $\gamma_j$. For example, the client component 140 can select ten nonces and randomly assign a different nonce to each entry in $\gamma_j$ to inhibit the final repository from determining files 130-133 with matching prefixes. Such an approach can also require additional search terms $\sigma$ for each nonce used. Accordingly, this approach has a minor possibility for false positive results. It is to be noted, that such an approach is just one possible solution, and the foregoing is not limited to this approach.

While the various embodiments presented herein provide strong protection(s) for data privacy and integrity, there can be a significant practical overhead in the various data communications undertaken during operation of the various embodiments. For example, the vectors for $\gamma_j$ could contain share prefixes for each file in the archival system 100. While this is tractable for prefix matching, in a generalized search case (e.g., for a substring at a particular location in any of files 130-133), this would effectively transfer a vector the size of the entire archive as many as T+1 times. For use cases with small amounts of critical data, this could be acceptable but can be a practical limitation. Maintaining one repository locally with the client component 140 is one approach to mitigate a portion of the communications overhead. In a 3:5-based archival system 100, this approach could significantly reduce the network communications.

As well as prefix matching, the various embodiments presented herein can be utilized for secure and resilient set membership testing, without a list of items in the set being revealed. For set membership testing, a set of data (e.g., a list of names, NA . . . NZ) in a file can be split into n shares (e.g., $NA_1 \ldots NA_n$) which are distributed across an archive of N repositories (e.g., shared across the entirety of repositories #1-#6). In an aspect, each file can correspond to an item that is a member of that set (e.g., a name of a patient in a hospital, a name of a confidential informant, etc.). In such an embodiment, no single repository would ever hold the complete set, but the list could easily be queried to confirm whether a given name is a member of the set. For example, a client (e.g., client component 140) can perform a query Q as to whether "John" is a member of the set, whereby the query can be performed in a manner similar to the prefix search, as previously described. Accordingly, a set membership can be securely verified without having to share the entire membership list with any one individual, a single location, or a single repository.

In addition to prefix matching, the various embodiments presented herein are also applicable to reassembly (e.g., serial reassembly) of a specific file (e.g., any of files 130-133) in the archival system 100. Algorithm 2, below, presents an embodiment to enable a file to be reassembled. In this embodiment, a vector utilized to pass around data, $\gamma_j$, represents one or more intermediate states for the reassembly of the original file (e.g., any of files 130-133) as opposed to enabling determination of prefix data for each share (e.g., any of $d_1$-$d_n$) in a repository (e.g., any of repository 111-116). Accordingly, in the embodiment represented by algorithm 2, the vector $p_f(x_j)$ represents the sequence of data points in the share held on repository j for a given file f. Additionally, a unique nonce is required for each word in a file, and accordingly, a nonce can now be represented as a vector (v).

Algorithm 2 enables the serial reassembly of files within an archival system 100. It utilizes nonces known to the client component 140, and messages between repositories to reduce the need to communicate raw share data across the archival system 100 back to the client component 140. As previously mentioned, setting up one repository locally can improve performance. While not impervious, the approach presented in algorithm 2 provides significant difficulties for a man-in-the-middle type attack.

Algorithm 2: A serial reassembly algorithm for a secret-split archive.

1: procedure REASSEMBLE(File ID f)
2: Client component 140 generates query ID, q.
3: Client component 140 sends message $m_0$=[q, f, {x1, . . . , xt}] to repository #1.
4: Repository #1 computes $$\tilde{\gamma}_1 = L_1(0) \cdot p_f(x_1)$$

5: Repository #1 sends $\tilde{m}_1$=[q, f, $\tilde{\gamma}_1$, {$x_1, \ldots x_t$}] to the client component 140.
6: Client component 140 computes $$\gamma_1 = \tilde{\gamma}_1 + v_1$$

7: Client component 140 sends $m_1$=[q, f, $\gamma_1$, {$x_1, \ldots x_t$}] to repository #2.
8: for j=2, . . . , T−1 do
9: if j is even then
10: Repository j receives message $m_{j-1}$ and computes $$\gamma_j = L_j(0) \cdot p_f(x_j) + \gamma_{j-1}$$

11: Repository j sends $m_j$=[q, f, $\gamma_j$, {$x_1, \ldots x_t$}] to repository j+1.
12: else
13: Repository j receives message $m_{j-1}$ and computes $$\tilde{\gamma}_j = L_j(0) \cdot p_f(x_j) + \gamma_{j-1}$$

14: Repository j sends $\tilde{m}_j=[q, f, \tilde{\gamma}_j, \{x_1, \ldots x_t\}]$ to the client component 140.

15: The client component 140 computes $$\gamma_j = \tilde{\gamma}_j + v_j$$

16: The user sends $m_j=[q, f, \gamma_j, \{x_1, \ldots x_t\}]$ to repository j+1.

17: end if

18: end for

19: Repository T receives message $m_{T-1}$ and computes $$\gamma_T = L_T(0) \cdot p_f(x_T) + \gamma_{T-1}$$

20: Repository T sends $m_* = [q, f, \gamma_T]$ to the client component 140.

21: The client component 140 subtracts the nonces and recovers the file's data.

22: end procedure

As previously described, the various embodiments presented herein detail prefix matching across an archive. It is to be appreciated that the methodology of prefix matching can be expanded to matching strings in any position in a file. While an overhead for such an embodiment may become burdensome, for cases in which data protection is critical and there is a strong need for resilience to insider threat, such overhead may be warranted. Further, the various embodiments presented herein can utilize serial interpolation for file reassembly. These algorithms provide novel capabilities while maintaining information-theoretic levels of data protections.

As long-term digital archives become favored, distributed archives can provide both the reliability and security needed. In such an archival system, the data is most secure when it is left at rest in the repositories. By utilizing serial interpolation, as described herein, data can remain secure as it is at rest in the exemplary archival systems and methods presented herein.

The various embodiments presented above can be utilized in a plurality of scenarios. Such scenarios can include a situation whereby a doctor is visiting a hospital and desires to know if a particular patient is at the hospital. Accordingly, the doctor can undergo required authentication, authorization and access control (AAA) to enable their interaction with the archival system 100, and further, to access the client component 140. Upon satisfaction of any AAA requirement in force at the hospital, the doctor can perform a query for any of the patients name, a hospital name, etc., to identify if the patient is at the hospital. The various repositories can be located at various locations (e.g., data center, hospitals, etc.), and by logging in on at the client component 140 located at hospital X, the search can be constrained such that only repositories pertaining to hospital X, and its patients, is searched. Based upon a patient name match being found, the doctor can be informed that the patient has been admitted to the hospital.

In an aspect, a technician at the hospital may want to obtain data about the patient. However, the hospital may have a requirement such that no technicians can have single access to patient data, and accordingly, the technician has to access the client component 140 concurrent with access by a second technician.

In another example scenario, a company may be a Fortune 500 company and desires to keep its finances exposed to as few people as possible. The company has a corporate budget office, which, amongst other activities, generates quarterly reports. However, the company believes that there is at least one person in their corporate office who is also employed by a competitor. The financial data can be shared across a plurality of repositories, but only people who are trusted employees can access the client component 140, and accordingly perform queries on the financial data. Hence, during ongoing operation of the company, hourly, daily, weekly, etc., budgets can be generated without exposing the current financial state of the company. The only finances that are exposed to any non-trusted employees, is at the end of each quarter.

In another example scenario, the repositories can be a plurality of devices that are communicatively coupled together (or a plurality of partitions on a shared storage device). Accordingly, a person can generate a file (e.g., a word processing document, an image, a spreadsheet, etc.) whereby the file can undergo splitting into a plurality of shares, as previously described. The shares can be distributed across the plurality of devices and/or the storage partitions. The next time the person wishes to work on the file, the file can be reassembled from the plurality of shares, whereby, upon completing the work, the latest version of the file can be once again split into a plurality of shares. Hence, if one of the plurality of devices is a portable computing device (e.g., a laptop computer, a tablet pc, etc.), and the person has the portable computing device stolen or is lost, the person does not have to be concerned about any shares formed from sensitive data being stored on the computing device, as it is not possible for the thief, or other party, to reassemble the file comprising the sensitive data from the single shared stored on the computing device. The person can still reassemble the file from the other devices in the plurality of devices.

Figure 5:
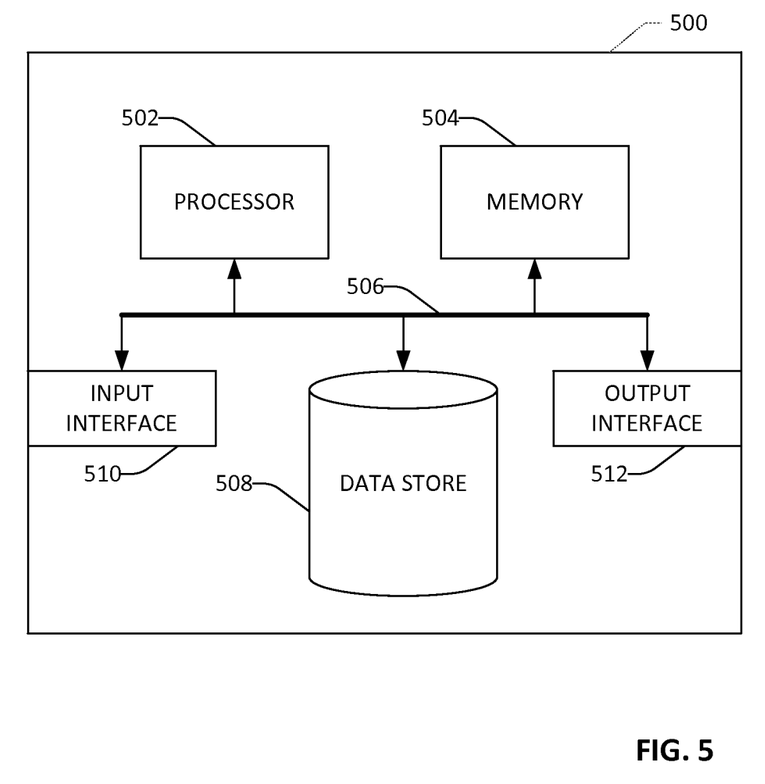
FIG. 5 illustrates an exemplary computing device.

Referring now to FIG. 5, a high-level illustration of an exemplary computing device 500 that can be used in accordance with the systems and methodologies disclosed herein is illustrated. For instance, the computing device 500 may be utilized to query a plurality of shares without having to reassemble the shares. For example, computing device 500 can operate as a client component 140. Further, the computing device 500 can be utilized to operate as a custodian component(s) (e.g., any of custodians 121-126). The computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store operating parameters, required operating parameters, and so forth.

The computing device 500 additionally includes a data store 508 that is accessible by the processor 502 by way of the system bus 506. The data store 508 may include executable instructions, operating parameters, required operating parameters, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc., by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An archival system, comprising:
a plurality of repositories, wherein the plurality of repositories each store a share generated from a common data file, the data file includes a secret, and the secret can only be determined by reassembly of a threshold number of the shares stored at the plurality of repositories;
a computing device comprising a processor and memory, the memory storing instructions that, when executed by the processor, cause the computing device to perform acts comprising:
selecting a threshold number of repositories from the plurality of repositories, wherein the threshold number of repositories include the threshold number of the shares;
generating a search query, the search query includes a term that is utilized to determine whether the threshold number of shares include the secret;
instructing the threshold number of repositories to execute the query, wherein the query is to be executed serially across the threshold number of repositories and the query comprises instructions to:
interpolate, at each repository in the threshold number of repositories, a value of each share respectively stored at each repository;
determine, at a final repository in the threshold number of repositories, a value of a final share in the threshold number of shares; and
determine that the value of the final share matches the term in the query;
receive from the final repository in the threshold number of repositories a notification of whether the term in the query matches the secret; and
in response to receiving an indication in the notification that the term in the query matches the secret, generating a message that the query matches the secret.

2. The archival system of claim 1, wherein each share is a sibling share.

3. The archival system of claim 2, wherein no two sibling shares are stored on a same repository.

4. The archival system of claim 1, the acts further comprising generating the shares from the data file by utilizing a generating polynomial, the secret has a value located at x=0 of a curve generated by the generating polynomial.

5. The archival system of claim 1, wherein the acts further comprise:
instructing a first repository in the threshold of repositories to execute a first interpolating algorithm on a first share stored at the first repository to determine a first contribution of the first share to the secret; and
receiving from the first repository, the first contribution.

6. The archival system of claim 5, wherein acts further comprise:
upon receipt of the first contribution, instructing a second repository in the threshold number of repositories to execute a second interpolating algorithm on a second share stored at the second repository to determine a second contribution of the second share to the secret, wherein the second interpolating algorithm is seeded with the first contribution; and
instructing the second repository to forward the second contribution to the final repository in the threshold of repositories.

7. The archival system of claim 6, wherein the acts further comprise:
upon receipt of the first contribution, instructing the final repository in the threshold of repositories to execute a third interpolating algorithm on a third share stored at the final repository to determine a third contribution of the third share to the secret, wherein the third interpolating algorithm is seeded with the second contribution;

instructing the final repository to determine a value at x=0 of the third contribution;

forwarding the term in the query to the final repository;

instructing the final repository to compare the term to the value at x=0 of the third contribution; and instructing the final repository to generate the notification indicating a result of the comparison of the term to the value at x=0 of the third contribution.

8. The archival system of claim 7, wherein the archival system is secure in an event of up to one repository in the threshold number of repositories remains uncompromised.

9. The archival system of claim 7, wherein first interpolating algorithm, the second interpolating algorithm, and the third interpolating algorithm are Lagrange interpolating algorithms.

10. The archival system of claim 7, to the acts further comprising applying a nonce during at least one of generation of the search query, instructing the second repository in the threshold of repositories to execute a second interpolating algorithm; or instructing the final repository in the threshold of repositories to execute the third interpolating algorithm.

11. The archival system of claim 1, wherein the threshold number of repositories is less than or equal to the plurality of repositories.

12. The archival system of claim 1, wherein each repository in the plurality of repositories are located at disparate locations.

13. The archival system of claim 1, the acts further comprising, in response to receiving an indication in the notification that the term in the query does not match the secret, generating a message that the query does not match the secret.

14. A method, comprising:

executing a search over a plurality of data repositories based upon a query, the query comprising a term, the plurality of data repositories collectively comprise a data set that is partitioned across the data repositories such that the data set is unable to be reassembled unless contributions to the data set are respectively acquired from a threshold plurality of the data repositories, the data set comprises a file;

determining that a secret in the file matches the term in the query based upon the search, the determining undertaken without the data set being reassembled and comprises:

identifying a threshold number of shares in a plurality of shares;

selecting a number of repositories in the plurality of data repositories, whereby the number of repositories equals the threshold number of shares;

interpolating, at each repository associated with the threshold number of shares, a value of each share at each repository;

determining, at a final repository, a value of a final share in the threshold number of shares; and determining that the value of the final share matches the term in the query; and outputting an indication that the file includes the term in the query responsive to determining that the secret matches the term in the query.

15. The method of claim 14, wherein the data set is partitioned using a generating polynomial, whereby the generating polynomial is configured such that the secret is located at a co-ordinate x=0.

16. The method of claim 14, wherein the data set is partitioned into the plurality of shares, each share is located at a repository such that no two shares are located on the same repository.

17. A non-transitory computer-readable storage medium comprising instructions that, when executed by a processor, cause the processor to perform acts comprising:

executing a search over a plurality of data repositories based upon a query, the query comprising a term, the plurality of data repositories collectively comprise a data set that is partitioned across the data repositories such that the data set is unable to be reassembled unless contributions to the data set are respectively acquired from a threshold plurality of the data repositories, the data set comprises a file;

determining that the file includes the term in the query based upon the search, the determining undertaken without the data set being reassembled and comprises:

identifying a threshold number of shares in the plurality of shares into which the data set is partitioned;

selecting a number of repositories in the plurality of data repositories, whereby the number of repositories equals the threshold number of shares;

interpolating, at each repository associated with the threshold number of shares, a value of each share at each repository;

determining, at a final repository, a value of a final share in the threshold number of shares; and determining that the value of the final share matches the term in the query; and outputting an indication that the file includes the term in the query responsive to determining that the file includes the term in the query.

18. The non-transitory computer-readable storage medium of claim 17, wherein each share in the plurality of shares is located at a repository such that no two shares are located on the same repository.

19. The non-transitory computer-readable storage medium of claim 17, wherein the search is supplemented by utilizing a nonce, whereby the nonce enables the term to be obscured.

20. The non-transitory computer-readable storage medium of claim 17, wherein the acts further comprise partitioning the data set using a generating polynomial, whereby the generating polynomial is configured such that the secret is located at a co-ordinate x=0.

* * * * *